(12) United States Patent
Wang et al.

(10) Patent No.: US 12,511,145 B2
(45) Date of Patent: Dec. 30, 2025

(54) RELIABLE ONE-CLICK CLUSTER SHUTDOWN

(71) Applicant: Dell Products L.P., Round Rock, TX (US)

(72) Inventors: Bo Wang, Shanghai (CN); Xing Yu, Shanghai (CN); Sheng Tan, Shanghai (CN); Yena Chen, Shanghai (CN); Xiling Cai, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 604 days.

(21) Appl. No.: 17/719,154

(22) Filed: Apr. 12, 2022

(65) Prior Publication Data

US 2023/0325227 A1 Oct. 12, 2023

(30) Foreign Application Priority Data

Mar. 22, 2022 (CN) .......................... 202210308289.8

(51) Int. Cl.
*G06F 9/455* (2018.01)
(52) U.S. Cl.
CPC .. *G06F 9/45558* (2013.01); *G06F 2009/4557* (2013.01); *G06F 2009/45575* (2013.01)

(58) Field of Classification Search
CPC ......... G06F 9/45558; G06F 2009/4557; G06F 2009/45575; G06F 9/442; G06F 9/4893; G06F 9/5072
See application file for complete search history.

(56) References Cited

U.S. PATENT DOCUMENTS

| | | | |
|---|---|---|---|
| 2020/0183725 A1* | 6/2020 | Grehan | G06F 3/0664 |
| 2021/0028985 A1* | 1/2021 | Banerjee | H04L 41/0806 |
| 2021/0255778 A1* | 8/2021 | Garewal | G06F 3/0673 |
| 2022/0107814 A1* | 4/2022 | Parab | G06F 9/4418 |

* cited by examiner

*Primary Examiner* — Sisley N Kim
(74) *Attorney, Agent, or Firm* — Jackson Walker L.L.P.

(57) ABSTRACT

An information handling system may include at least one processor and a memory. The information handling system may be a node of an information handling system cluster that comprises a plurality of nodes, and the information handling system is configured to: receive a shutdown instruction from a user, the shutdown instruction indicating that the cluster is to be powered down; and without further user input: cause virtual machines (VMs) that are executing on the cluster to be migrated to a particular node of the cluster that has been designated as a primary node; store metadata at the primary node, the metadata being usable to reestablish communication among the nodes after the shutdown; and cause the plurality of nodes to power down.

18 Claims, 5 Drawing Sheets

RELIABLE ONE-CLICK CLUSTER SHUTDOWN

TECHNICAL FIELD

The present disclosure relates in general to information handling systems, and more particularly to techniques for reliably and easily shutting down and restarting clusters of two or more information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware© vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

It may be useful in some situations to be able to shut down a cluster of information handling systems (e.g., to perform maintenance). Doing so simply (e.g., with a one-click operation) and reliably is also beneficial. However, if such shutdown operations are not handled properly, they may lead to data unavailability.

Accordingly, embodiments of this disclosure may improve on existing cluster shutdown techniques, reducing the possibility of data unavailability during the cluster shutdown, as well as removing external dependencies (e.g., Network Time Protocol (NTP) and/or other dependencies that existing techniques may rely on). Embodiments may also provide error handling for various issues that may arise during operation.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with cluster shutdown may be reduced or eliminated.

In accordance with embodiments of the present disclosure, an information handling system may include at least one processor and a memory. The information handling system may be a node of an information handling system cluster that comprises a plurality of nodes, and the information handling system is configured to: receive a shutdown instruction from a user, the shutdown instruction indicating that the cluster is to be powered down; and without further user input: cause virtual machines (VMs) that are executing on the cluster to be migrated to a particular node of the cluster that has been designated as a primary node; store metadata at the primary node, the metadata being usable to reestablish communication among the nodes after the shutdown; and cause the plurality of nodes to power down.

In accordance with these and other embodiments of the present disclosure, a computer-implemented method may be executable by an information handling system that is a node of an information handling system cluster that comprises a plurality of nodes, the method comprising: receiving a shutdown instruction from a user, the shutdown instruction indicating that the cluster is to be powered down; and without further user input: causing virtual machines (VMs) that are executing on the cluster to be migrated to a particular node of the cluster that has been designated as a primary node; storing metadata at the primary node, the metadata being usable to reestablish communication among the nodes after the shutdown; and causing the plurality of nodes to power down.

In accordance with these and other embodiments of the present disclosure, an article of manufacture may include a non-transitory, computer-readable medium having computer-executable instructions thereon that are executable by a processor of an information handling system that is a node of an information handling system cluster that comprises a plurality of nodes for: receiving a shutdown instruction from a user, the shutdown instruction indicating that the cluster is to be powered down; and without further user input: causing virtual machines (VMs) that are executing on the cluster to be migrated to a particular node of the cluster that has been designated as a primary node; storing metadata at the primary node, the metadata being usable to reestablish communication among the nodes after the shutdown; and causing the plurality of nodes to power down.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
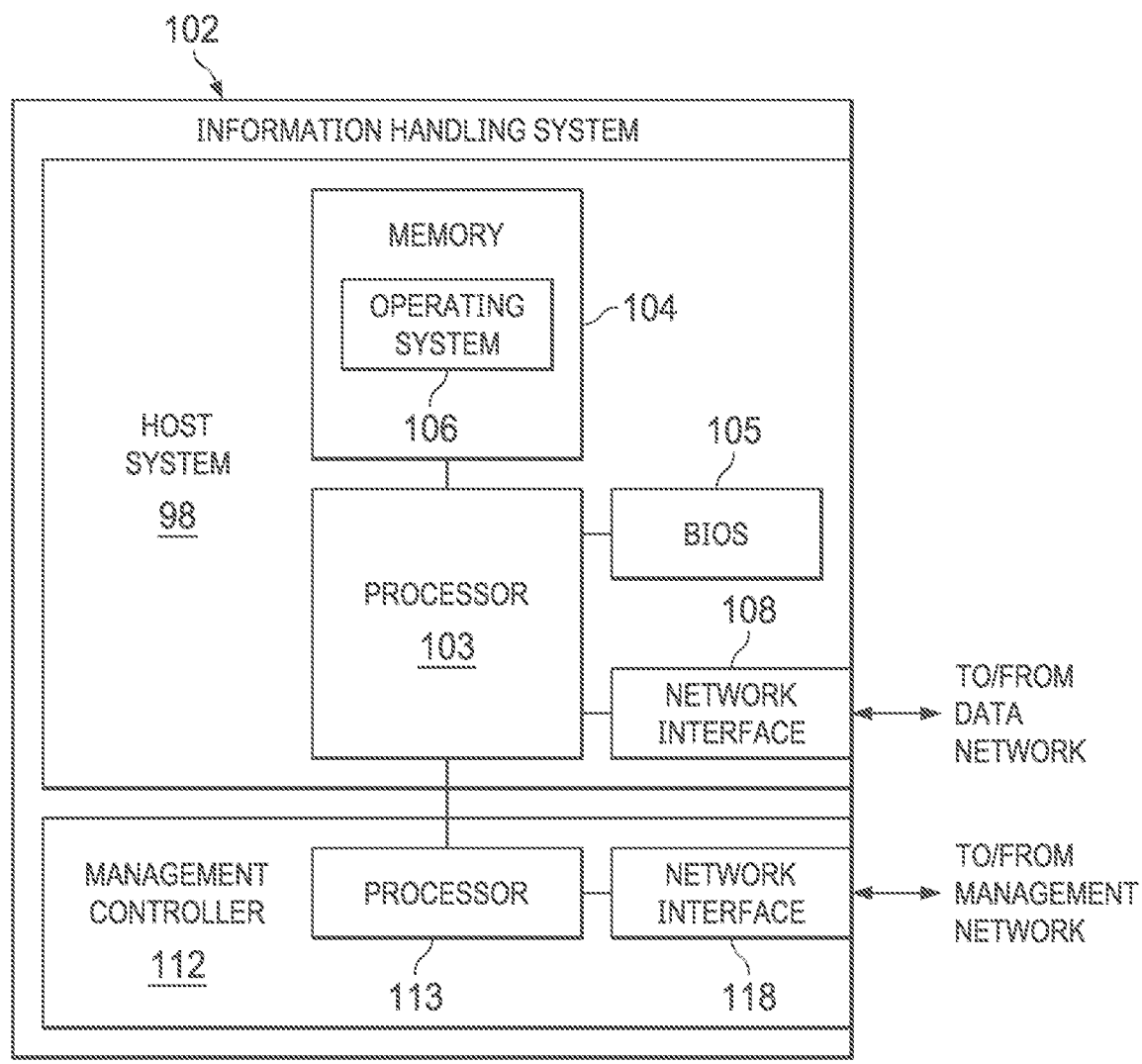
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide improved techniques for shutting down a cluster of information handling systems such as information handling system 102. This may be accomplished in some embodiments via a single interaction with a management interface such as a virtual console, serial console, a graphical user interface, a text user interface, etc. The single interaction may be a click of a pointing device (e.g., a mouse, touchpad, trackpad, trackball, etc.), an interaction with a keyboard or button, etc. For example, a management interface may display a button configured to shut down the cluster, and a user may select that button without the need to provide further input to effectuate the cluster shutdown.

Figure 2:
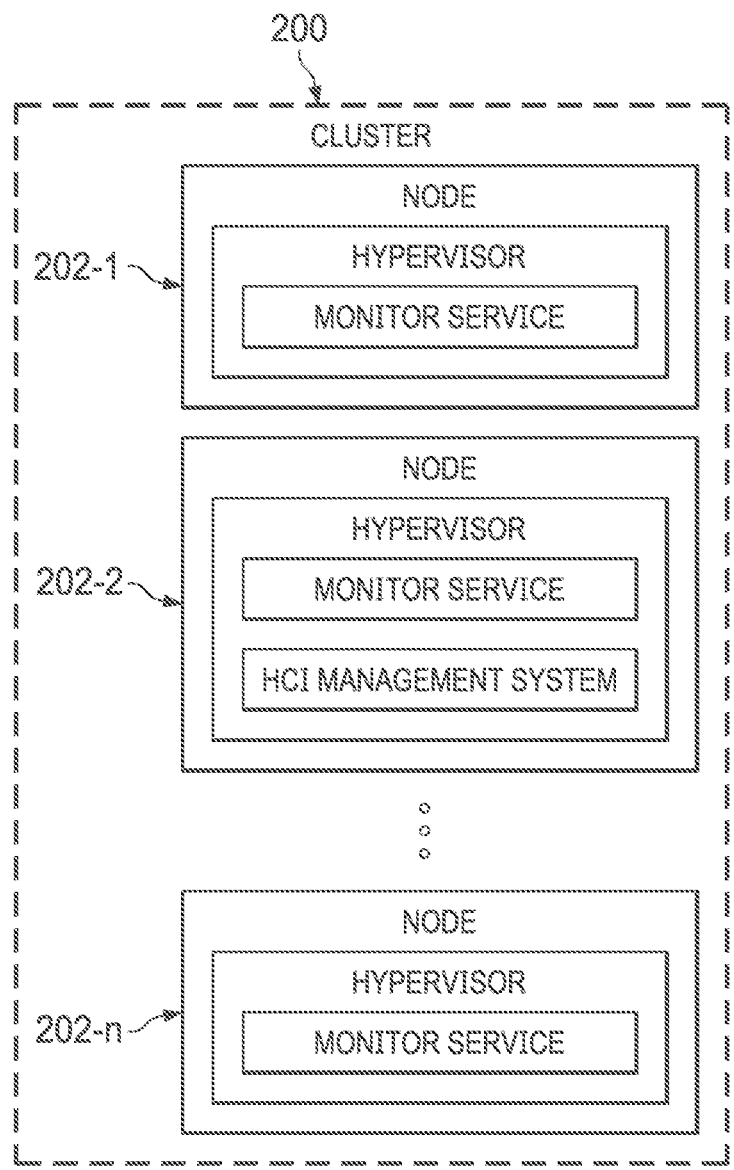
FIG. 2 illustrates a block diagram of an example cluster, in accordance with embodiments of the present disclosure.

FIG. 2 illustrates an example cluster 200, including information handling system nodes 202-1 through 202-*n*. Each node may include a hypervisor and a monitor service, which may run within a VM in some embodiments. As discussed in more detail herein, the monitor service may carry out the node shutdown procedure and coordinate cluster startup operations.

A particular node (in this example, node 202-2) may also execute an HCI management system (also referred to as a manager), which may also run in a VM. The HCI management system may be present on more than one node in some embodiments, and so at any particular time, it may be executing on node 202-2 or on some node other than node 202-2.

In general, a shutdown of cluster 200 may proceed in two phases. In the first phase, cluster 200 may be shut down. In the second phase (e.g., after maintenance has been completed), cluster 200 may be started back up.

Figure 3:
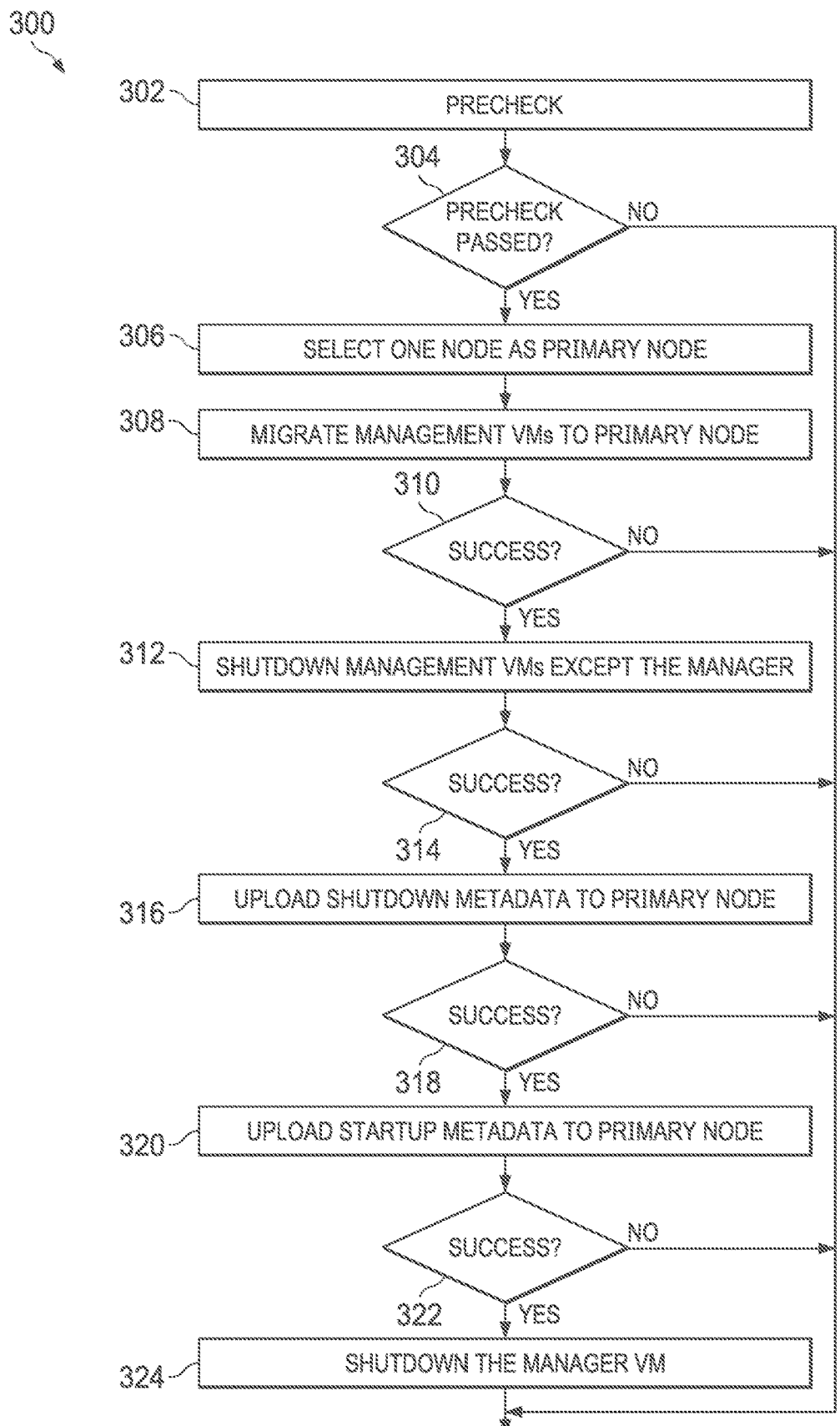
FIGS. 3-5 illustrate example process flows, in accordance with embodiments of the present disclosure.

Turning now to FIG. 3, a flow chart is shown of an example method 300 for the shutdown phase, which may be performed by an HCI management system executing in a VM on a particular node. Method 300 may be initiated when a user requests a shutdown of a cluster.

At step 302 a precheck is performed to verify that the cluster is in a state that is suitable for shutdown. If the precheck passes at step 304, then one node is selected as primary at step 306. The primary node is then responsible for managing certain aspects of the shutdown and restart procedure. The primary node may be selected in any suitable manner (e.g., randomly, pseudorandomly, deterministically, and/or based on hardware/software characteristics of the nodes).

At step 308, all management VMs that are executing on nodes other than the primary node are migrated to the primary node (e.g., via a live migration process such as vMotion). At step 312, all VMs other than the HCI management system VM are shut down.

At steps 316 and 320, shutdown metadata and startup metadata are respectively uploaded from all nodes to the primary node. Such metadata may generally include any information necessary for enabling communication between nodes. For example, the metadata may include node ID and connection information for each node, such as IP addresses, usernames, passwords, NIC identifiers, VM kernel identifiers, etc. In one embodiment, shutdown metadata may include host information such as the host IP address, and startup metadata may contain information regarding the management VM that is used during cluster startup.

At step 324, the HCI management system VM is shut down, and method 300 may end.

Figure 4:
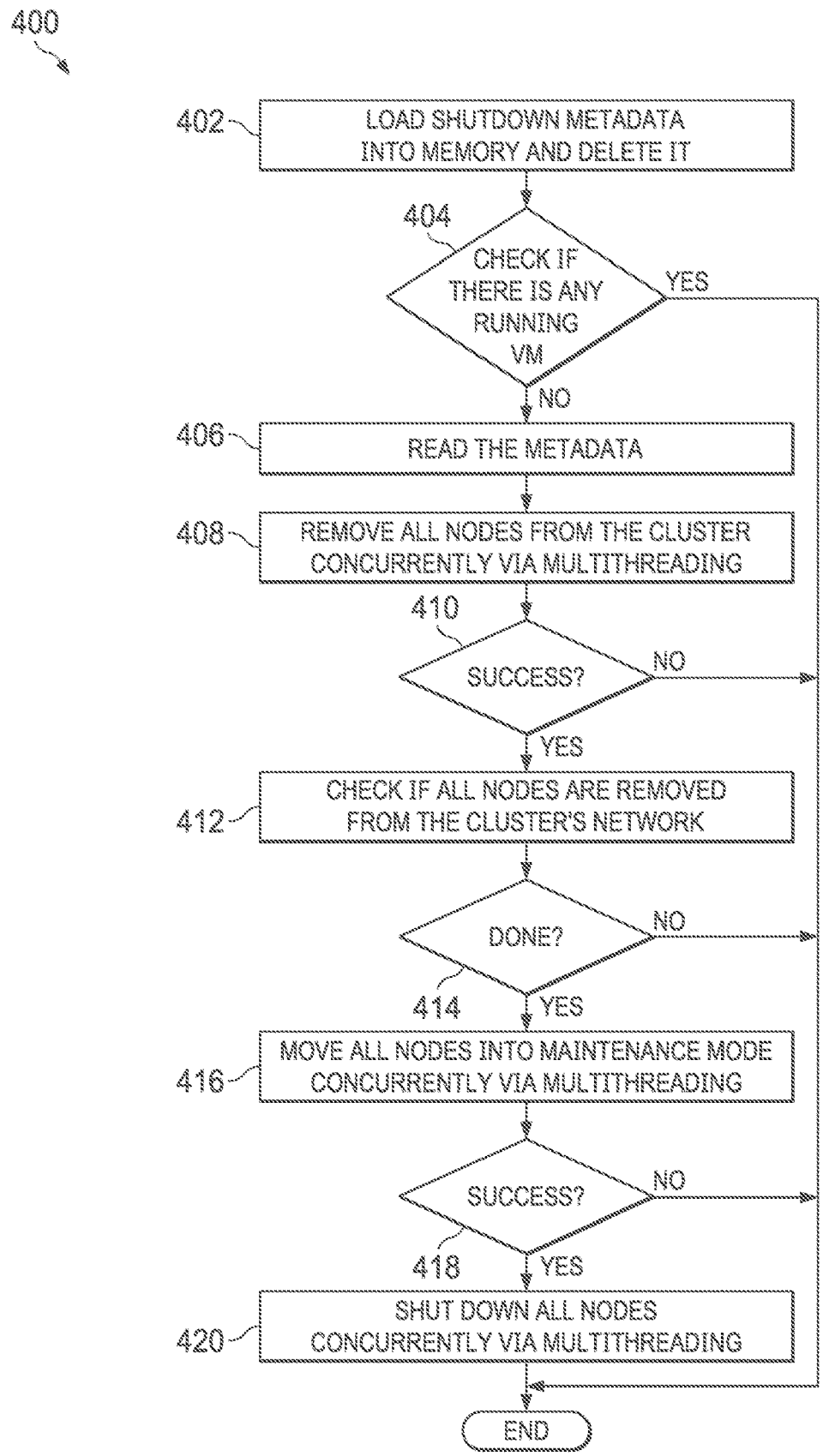

Turning now to FIG. 4, a flow chart is shown of another example method 400 for the shutdown phase, which may be performed by the monitor service executing in a VM on each node.

At step 402, the shutdown metadata may be loaded into the memory of the monitor service and then deleted from persistent storage. At step 404, the method may ensure that there are no running VMs remaining. At steps 408-414, the method may remove all nodes from the cluster network. This may be carried out in a concurrent and/or multithreaded fashion.

Once all nodes have been removed from the cluster network, at step 416, all nodes may be moved into maintenance mode. Generally, maintenance mode is a mode in which it is not possible to execute any new VMs. This also may be carried out in a concurrent and/or multithreaded fashion.

Once all nodes are in maintenance mode, then all nodes may be shut down at step 420. This may also be carried out in a concurrent and/or multithreaded fashion. Method 400 may then end.

Figure 5:
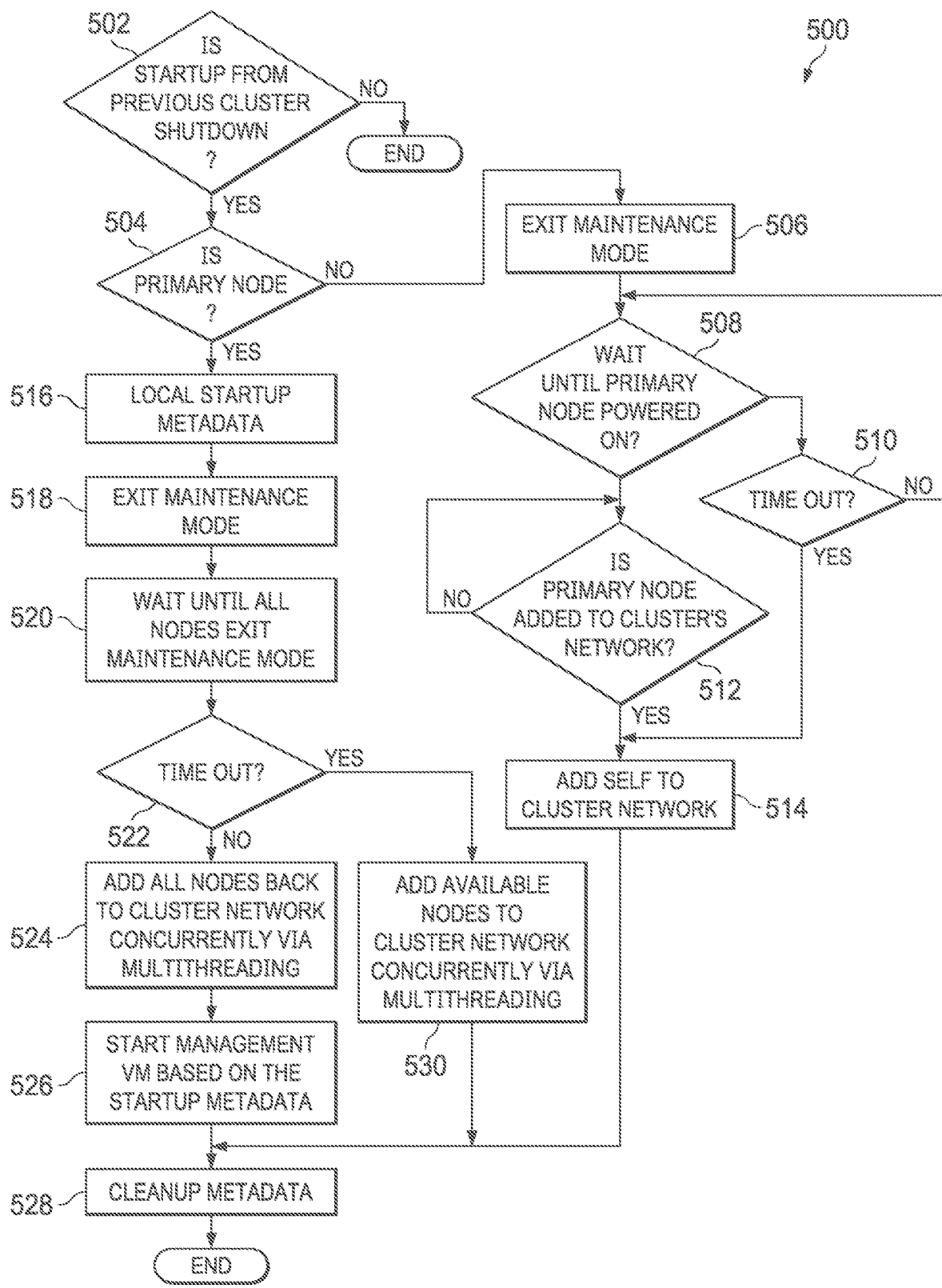

Turning now to FIG. 5, a flow chart is shown of an example method 500 for the startup phase, which may be performed by the monitor service executing in a VM on each node of a cluster that is returning from being shut down.

At step 502, the method may determine whether the cluster is starting up from a previous shutdown. If not (e.g., if it is the first time the cluster is being powered on), method 500 may end, and the cluster may start up according to a standard startup method.

At step 504, the node executing method 500 may determine whether or not it is currently set as the primary node for the cluster. If not, the node may exit maintenance mode at step 506 and then attempt to wait for some other node to start up as the primary node.

In particular, the node may wait at step 508 (e.g., with a time out at step 510) for the primary node to be powered on. Once the primary node is powered on, the node may wait until the primary node is added to the cluster network at step 512, then add itself to the cluster network at step 514.

If the node executing method 500 is the primary node, then it may load the startup metadata at step 516, exit maintenance mode at step 518, and wait until all other nodes exit maintenance mode at step 520.

Once all nodes have exited maintenance mode, then they may be added to the cluster network at step 524. This may be carried out in a concurrent and/or multithreaded fashion.

The management VM may be started at step 526 based on the startup metadata, which may be cleaned up at step 528. The cluster is then in an operational state, and normal workload processing may resume.

If, on the other hand, a time out occurs at step 522 (e.g., because one or more other nodes do not power on and/or do not exit maintenance mode), then the node may add all the available nodes to the cluster network at step 530. This also may be carried out in a concurrent and/or multithreaded fashion. However, because one or more nodes are missing, human intervention may be required. Accordingly, the management VM is not initialized in this case, and the cluster does not resume processing normal workloads. In one embodiment, an administrator may be notified that not all of the nodes were able to start up and exit maintenance mode, and the administrator may take appropriate corrective action.

One of ordinary skill in the art with the benefit of this disclosure will understand that the preferred initialization point for the methods depicted in FIGS. 3-5 and the order of the steps comprising those methods may depend on the implementation chosen. In these and other embodiments, this methods may be implemented as hardware, firmware, software, applications, functions, libraries, or other instructions. Further, although FIGS. 3-5 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is a node of an information handling system cluster that comprises a plurality of nodes linked by a cluster network, wherein the cluster is configured to execute a hyper-converged infrastructure (HCI) management system as a plurality of management virtual machines (VMs), and wherein the information handling system is configured to:
   receive a shutdown instruction from a user, the shutdown instruction indicating that the cluster is to be powered down; and
   without further user input:
     select a particular node of the cluster as a primary node;
     cause the management VMs that are executing on nodes of the cluster other than the primary node to be migrated to the primary node;
     shut down all except one of the management VMs;
     store metadata at the primary node, the metadata being usable to reestablish communication among the nodes after the shutdown;
     cause the plurality of nodes to be concurrently disconnected from the cluster network;

cause the plurality of nodes to be concurrently transitioned to a maintenance mode, wherein a node in maintenance mode is unable to execute any new management VMs; and cause the plurality of nodes to concurrently power down.

2. The information handling system of claim 1, wherein the shutdown instruction is based on a single interaction from the user with a management interface.

3. The information handling system of claim 2, wherein the single interaction is a single click of a pointing device.

4. The information handling system of claim 2, wherein the single interaction is an interaction with a keyboard.

5. The information handling system of claim 1, wherein the causing the management VMs to be migrated, the storing metadata at the primary node, and the causing the plurality of nodes to power down are carried out by a VM executing on a hypervisor of the information handling system.

6. The information handling system of claim 1, wherein the cluster is a hyper-converged infrastructure (HCI) cluster.

7. A computer-implemented method executable by an information handling system that is a node of an information handling system cluster that comprises a plurality of nodes linked by a cluster network, wherein the cluster is configured to execute a hyper-converged infrastructure (HCI) management system as a plurality of management virtual machines (VMs), the method comprising:

receiving a shutdown instruction from a user, the shutdown instruction indicating that the cluster is to be powered down; and without further user input:

selecting a particular node of the cluster as a primary node;

causing the management VMs that are executing on nodes of the cluster other than the primary node to be migrated to the primary node;

shutting down all except one of the management VMs;

storing metadata at the primary node, the metadata being usable to reestablish communication among the nodes after the shutdown;

causing the plurality of nodes to be concurrently disconnected from the cluster network;

causing the plurality of nodes to be concurrently transitioned to a maintenance mode, wherein a node in maintenance mode is unable to execute any new management VMs; and causing the plurality of nodes to concurrently power down.

8. The method of claim 7, wherein the shutdown instruction is based on a single interaction from the user with a management interface.

9. The method of claim 8, wherein the single interaction is a single click of a pointing device.

10. The method of claim 8, wherein the single interaction is an interaction with a keyboard.

11. The method of claim 7, wherein the causing the management VMs to be migrated, the storing metadata at the primary node, and the causing the plurality of nodes to power down are carried out by a VM executing on a hypervisor of the information handling system.

12. The method of claim 7, wherein the cluster is a hyper-converged infrastructure (HCI) cluster.

13. An article of manufacture comprising a non-transitory, computer-readable medium having computer-executable instructions thereon that are executable by a processor of an information handling system that is a node of an information handling system cluster that comprises a plurality of nodes linked by a cluster network, wherein the cluster is configured to execute a hyper-converged infrastructure (HCI) management system as a plurality of management virtual machines (VMs), for:

receiving a shutdown instruction from a user, the shutdown instruction indicating that the cluster is to be powered down; and without further user input:

selecting a particular node of the cluster as a primary node;

causing the management VMs that are executing on nodes of the cluster other than the primary node to be migrated to the primary node;

shutting down all except one of the management VMs;

storing metadata at the primary node, the metadata being usable to reestablish communication among the nodes after the shutdown;

causing the plurality of nodes to be concurrently disconnected from the cluster network;

causing the plurality of nodes to be concurrently transitioned to a maintenance mode, wherein a node in maintenance mode is unable to execute any new management VMs; and causing the plurality of nodes to concurrently power down.

14. The article of claim 13, wherein the shutdown instruction is based on a single interaction from the user with a management interface.

15. The article of claim 14, wherein the single interaction is a single click of a pointing device.

16. The article of claim 14, wherein the single interaction is an interaction with a keyboard.

17. The article of claim 13, wherein the causing the managment VMs to be migrated, the storing metadata at the primary node, and the causing the plurality of nodes to power down are carried out by a VM executing on a hypervisor of the information handling system.

18. The article of claim 13, wherein the cluster is a hyper-converged infrastructure (HCI) cluster.

* * * * *